United States Patent

Allan

[11] 4,141,889
[45] Feb. 27, 1979

[54] SYMMETRICAL HEXAKISAZO COMPOUNDS HAVING A 2,2′-DISULFOSTILBENYL CENTRAL RADICAL

[75] Inventor: Zdenek Allan, Allschwil, Switzerland

[73] Assignee: Sandoz Ltd., Basel, Switzerland

[21] Appl. No.: 819,241

[22] Filed: Jul. 27, 1977

[30] Foreign Application Priority Data

Aug. 2, 1976 [CH] Switzerland .......................... 9832/76

[51] Int. Cl.² ............................................. C09B 35/36
[52] U.S. Cl. ..................... 260/144; 260/166; 260/198; 260/208; 8/7; 8/26; 8/41 R; 8/54.2; 162/162
[58] Field of Search ........................................ 260/144

[56] References Cited

U.S. PATENT DOCUMENTS

| 2,204,230 | 6/1940 | Rossander et al. ............... 260/144 X |
| 2,871,230 | 1/1959 | Huss et al. ............................ 260/144 |

FOREIGN PATENT DOCUMENTS

| 2363603 | 6/1974 | Fed. Rep. of Germany ........... 260/171 |
| 2216324 | 8/1974 | France ..................................... 260/171 |

*Primary Examiner*—Charles F. Warren
*Attorney, Agent, or Firm*—Gerald D. Sharkin; Richard E. Vila; Melvyn M. Kassenoff

[57] ABSTRACT

Symmetrical hexakisazo compounds of the formula

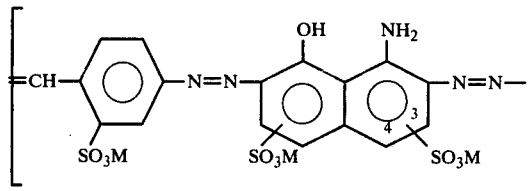

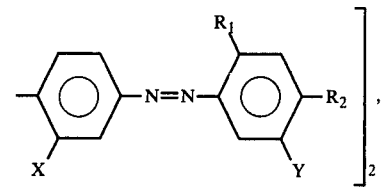

and mixtures of such compounds, wherein
  each X is hydrogen or $-SO_3M$,
  each $R_1$ is $-OH$ or $-NH_2$,
  each $R_2$ is $-OH$ or $-NH_2$,
  each Y is hydrogen, methyl, or $-SO_3M$, and
  each M, independently, is hydrogen or a non-chromophoric cation, their production, dye compositions containing them, and their use in the dyeing of cellulosic substrates such as cotton and paper.

27 Claims, No Drawings

SYMMETRICAL HEXAKISAZO COMPOUNDS HAVING A 2,2'-DISULFOSTILBENYL CENTRAL RADICAL

The invention relates to hexakisazo compounds.

The invention provides symmetrical compounds of formula I,

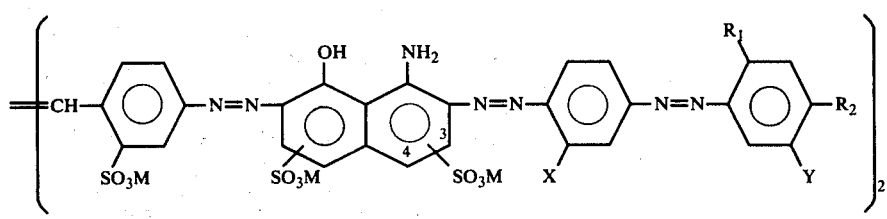

wherein
each X is hydrogen or —SO$_3$M,
each R$_1$ is —OH or —NH$_2$,
each R$_2$ is —OH or —NH$_2$,
each Y is hydrogen, methyl or —SO$_3$M, and
each M, independently, is hydrogen or a non-chromophoric cation,
and mixtures of two or more compounds of formula I.

In the compounds of formula I, preferably each R$_1$ is —OH and each R$_2$ is —NH$_2$ or each R$_1$ and R$_2$ is —NH$_2$ or each R$_1$ and R$_2$ is —OH, more preferably each R$_1$ and R$_2$ being —NH$_2$ or being —OH, most preferably each being —NH$_2$. Each Y is preferably hydrogen. Thus, the more preferred terminal groups in the compounds of formula I are 2,4-dihydroxy- and 2,4-diamino-phenyl, the latter being especially preferred.

The compounds of the invention preferably contain 6 or 8 sulpho groups, more preferably 6. Whilst the sulpho groups in the 1-amino-8-hydroxynaphthalene radical may, respectively be in the 5- or 6-, and 3- or 4-positions, the 4,5-disulpho substituted compounds are not preferred, preferred being the 3,6- and 4,6-disulpho substituted compounds, particularly the former.

Where M is a non-chromophoric cation, the exact nature thereof is not critical, any non-chromophoric cation conventional in the anionic dyestuff art being suitable, such as the alkali metal cations and the unsubstituted and substituted ammonium cations, e.g., those of the formula N$^\oplus$(R$_3$)$_4$ where each R$_3$, independently, is hydrogen, C$_{1-4}$alkyl or hydroxy C$_{2-4}$alkyl, unstable cations such as tetraalkanolammonium cations being, of course, avoided. As examples of cations may be given the lithium, sodium or potassium cations and the ammonium, mono-, di-, tri- and tetra-methylammonium, triethylammonium and mono-, di- and tri-ethanolammonium cations.

The preferred compounds of the invention are in salt form and, depending on the production and isolation techniques employed, the sulpho groups may be in the same or different salt forms. Preferably all the M's are alkali metal cations, the most preferred compounds of the invention being in sodium salt form or in mixed lithium/sodium salt form.

As a preferred class of compounds may be given the symmetrical compounds of formula I',

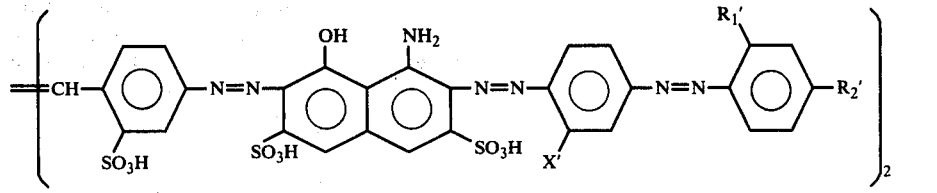

wherein
each X' is H or —SO$_3$H, preferably hydrogen, and
each R$_1$' and R$_2$' is —OH or is —NH$_2$, preferably the latter,
in sodium or mixed lithium/sodium salt form.

The invention also provides a process for the production of the compounds of formula I, which process comprises coupling the tetrazo derivative of a diamine of formula II,

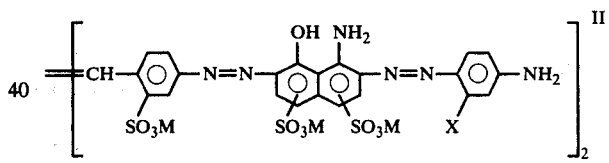

or a mixture thereof, with a coupling component of formula III,

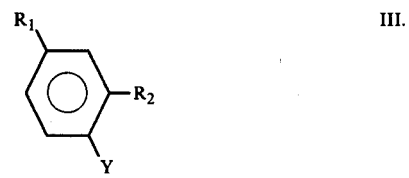

The above process may be carried out in conventional manner, e.g. at a temperature of 0° to 40° C., preferably at 10° to 40° C., preferably in aqueous medium. Where compound III is 1,3-diaminobenzene the pH of the medium is suitably from 5–10, preferably between 7 and 9, and where 1,3-dihydroxybenzene or 3-aminophenol, suitably from 7 to 10, preferably between 8 and 9. Where, in the compound of formula III, R$_1$ and R$_2$ are dissimilar, i.e., one is hydroxy and the other amino, and Y is hydrogen, an isomeric mixture is obtained, about 70 to 80% of the coupling taking place para to the amino group and the rest para to the hydroxy group. Such mixtures may be separated, but are preferably used as such, as hereinafter described.

The resulting compounds of formula I may be isolated and purified in conventional manner and conversion from one salt form to another can also be carried out in conventional manner, e.g., mixed lithium/sodium salt forms may be obtained by acidifying the sodium salt forms, followed by neutralization with lithium hydroxide.

The compounds of formula II can be obtained by coupling the tetrazo derivative of a diamine of formula IV

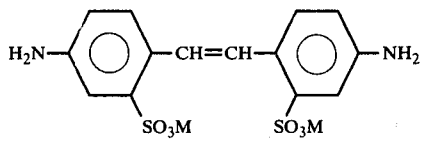

with a compound of formula V,

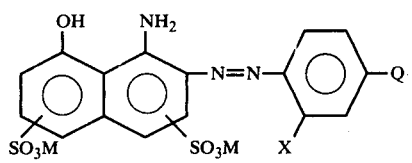

where Q is $-NH_2$ or $-NO_2$, and, where Q is $-NO_2$, reducing the $-NO_2$ groups in the product obtained.

The above process can be carried out in conventional manner, e.g., in alkali medium, preferably at pH 10, and at a temperature of preferably between 5° and 20° C. The reduction of the nitro groups is conveniently carried out at from 30° to 60° C., preferably using sodium sulphide as reducing agent.

The compounds of formulae III, IV and V are either known or may be obtained in conventional manner from available starting materials.

The compounds of formula I and mixtures thereof are anionic dyestuffs and, especially in salt form, are useful in the dyeing and printing of cellulosic substrates, being particularly indicated for the dyeing of paper and cotton substrates. For paper dyeing, the compounds with 6 or 8, especially 6, sulpho groups are preferred and, for dyeing cotton, the compounds with 6 sulpho groups are preferred.

Paper may be dyed according to the conventional techniques, i.e., in the stock or after sheet formation by dipping and surface dyeing procedures.

The compounds of formula I in salt form and especially in mixed sodium/lithium salt form have good water solubility properties, even in cold water. This enables the compounds to be added to paper stock, for the dyeing thereof, in powder or moist press-cake form or in the form of aqueous or solid dye preparations, without different shades arising from the different forms of addition, and enables the production of concentrated aqueous liquid dyestuff preparations, e.g., containing up to 50%, preferably up to 30%, by weight of dyestuff. Such liquid preparations may be prepared in conventional manner and contain conventional additives such as solubilizing aids and stabilizers, e.g., alkanolamines, diglycolamines and acid amides, such as formamide, dimethylformamide and urea. Such liquid dyestuff preparations, as is normal, preferably have a low salt content, to which end any press-cake employed for their production should preferably have as low a salt content as possible, i.e., only the minimum amount of salt for salting out the compounds should preferably be employed. Typical liquid dye preparations contain:

100 parts by weight of a compound or mixture of compounds of formula I in salt form,
1-100, preferably 1 to 10, parts by weight of salt,
100-800 parts by weight of water,
0-500 parts by weight of solubilizing agent (alkanolamine such as diethanolamine or triethanolamine or hydroxyalkoxyalkylamine, wherein the alkyl moieties are of 2 to 4 carbon atoms) and
0-30% by weight of the water contained in the preparation of an amide, such as formamide or urea.

The liquid aqueous preparations may be suspensions or, preferably, true solutions, which solutions may be produced either by employing such amounts of the ingredients as to obtain a true solution or by filtration of a solid-containing solution.

The compounds of formula I can also be formed into solid dyestuff preparations, for example into powder or granulate preparations, the granulate preparations preferably having an average particle size greater than 20μ. Again, the salt content is preferably kept low. Typical solid dyestuff preparations contain:

100 parts by weight of compound of formula I or mixture thereof in salt form,
1-50 parts by weight of an ionizable salt, such as an alkali metal, preferably sodium, chloride, carbonate or sulphate,
0-200 parts by weight of a standardizing agent, e.g., starch, starch degradation products, dextrin, urea, soda, sugar, etc.
and up to 15% by weight residual moisture.

The solid dyestuff preparations are preferably prepared by drying aqueous solutions or suspensions containing the desired ingredients.

The compounds of formula I and their mixtures produce grey to deep black dyeings and, in addition to their good water solubility, possess high substantivity leading to minimum colouration of the back-water from paper dyeing machines.

The dyeings obtained employing the compounds of formula I and their mixtures, both on cotton and paper, possess notable light and wet fastness properties, the paper dyeings showing notable resistance to water, milk, fruit juices and sweetened mineral waters and notable alcohol fastness.

The following Examples, in which all parts and percentages are by weight and the temperatures in degrees centigrade, further illustrate the invention.

EXAMPLE 1

43.6 Parts of 1-amino-4-nitrobenzene-2-sulphonic acid are diazotized in the usual manner at 12° and a pH of 1.3 with sodium nitrite and hydrochloric acid.

63.8 Parts of 1-amino-8-hydroxynaphthalene-3,6-disulphonic acid are dissolved in water with addition of sodium carbonate. The solution is added, over the course of 5 minutes, to the diazo compound, the temperature being kept at 12° by adding ice. The pH is kept below 1.4. Stirring is maintained for 1 hour, and the pH is subsequently set to 8 by adding sodium hydroxide, whereupon the nitroazo dyestuff which is separated during the coupling reaction goes into solution again. In order to reduce the nitro group, the reaction mixture is heated to 50° and a solution of 23.4 parts of sodium sulphide is added over the course of 5 minutes. After cooling to 25°, the mixture is acidified to a pH of 6 with hydrochloric acid, and the diaminoazo compound is salted out with sodium chloride and suctioned off.

This intermediate product is again dissolved in water with addition of sodium hydroxide until a pH of 10 is achieved. A suspension of 37.0 parts of 4,4'-diaminostilbene-2,2'-disulphonic acid, which has been diazotized in the usual manner with sodium nitrite and hydrochloric acid, is added. Whilst this is being added, the temperature is kept at 10°–15° by adding ice and the pH is kept at 10 by adding sodium carbonate. The coupling mixture is stirred for 3 hours, and the tetrakisazo compound formed is subsequently precipitated by acidifying the mixture with hydrochloric acid to a pH of 5. It is isolated and again dissolved in water, adding sodium carbonate. The solution is acidified with hydrochloric acid to a pH of 1.5 and cooled to 10° by adding ice. The tetrakisazo compound is diazotized by treatment for 30 minutes with a solution of 13.8 parts of sodium nitrite. In order to complete the coupling process, 21.6 parts of 1,3-phenylenediamine are sprinkled in, in powder form, and, after 15 minutes, the pH of the suspension obtained is set firstly at 6.5 with sodium carbonate and after a further 15 minutes at 8.5–9 with sodium hydroxide. The coupling mixture is stirred for 3 hours at 10°–20°, then heated and stirred for a further 3 hours at 40°. The hexakisazo dyestuff which separates is isolated; it corresponds to the formula and the nitro azo dyestuff was salted out using sodium chloride and isolated.

The intermediate was then dissolved in water. 100 Parts of sodium naphthalene-2-sulfonate was added and a suspension of 37.0 parts of diazotized diaminostilbene-2,2'-disulphonic acid was run in. During the addition the temperature was kept at 10°–15° by addition of ice, and the pH was kept at 10 by addition of sodium carbonate. The coupling mixture was stirred for 8 hours, the tetrakisazo product being mostly dissolved. To reduce the nitro group, the solution was then warmed to 50° and, over 5 minutes, a solution of 23.4 parts of sodium sulphide was run in. By cooling to 25° and setting the pH to 6 by addition of hydrochloric acid, the diaminotetrakisazo compound is precipitated and isolated. It is then redissolved in water with addition of sodium carbonate. The solution is acidified to pH 1.5 using hydrochloric acid and cooled to 10° by addition of ice. Diazotization of both amino groups was then effected over 3 minutes, employing a solution of 13.8 parts sodium nitrite.

The coupling reaction with 21.6 parts of 1,3-phenylenediamine is carried out as in Example 1. The precipitated hexakisazo dyestuff was isolated. It has the formula

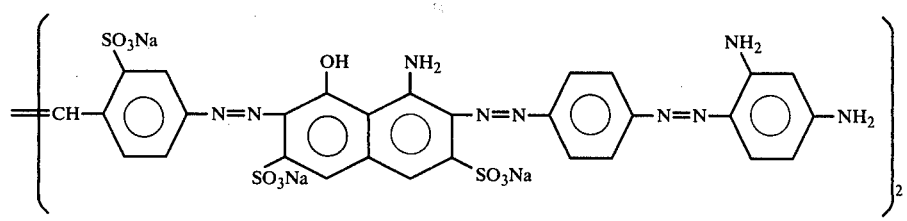

and is a black powder which dissolves in water with addition of sodium carbonate and dyes paper and cotton in black shades.

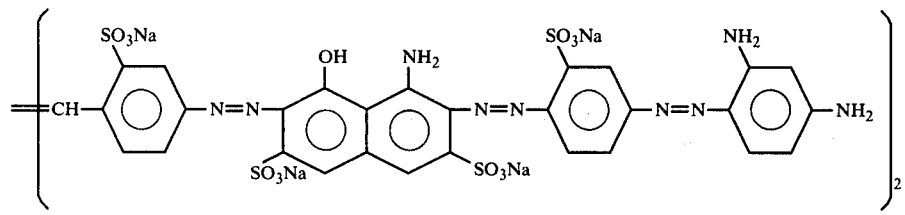

and is a black powder which dissolves readily in water after addition of sodium carbonate and dyes paper in black shades.

EXAMPLE 2

27.6 Parts of 1-amino-4-nitrobenzene were diazotized in like manner to the 1-amino-4-nitrobenzene-2-sulphonic acid 63.8 parts of 1-amino-8-hydroxynaphthalene-3,6-disulphonic acid were dissolved in water with addition of sodium carbonate. This solution was added, over 5 minutes, to the diazo compound, the temperature being kept to 12° by addition of ice. The pH was kept below 1.4. Stirring took place for 8 hours, whereafter the pH was set to 8 by addition of sodium hydroxide, Following the procedure of Example 1 or Example 2, above, the compounds in the following table are prepared, employing appropriate starting materials. They are of the formula

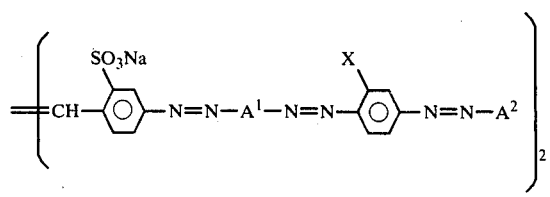

where X, $A^1$ and $A^2$ are as given in the table.

| Ex. No. | X | A¹ | A² | Shade of dyeing on paper | Shade of dyeing on cotton |
|---|---|---|---|---|---|
| 3 | —SO₃Na | OH, NH₂ naphthalene with SO₃Na, SO₃Na | phenyl-NH₂ with NH₂ | grey to deep black | — |
| 4 | H | " | " | " | grey to deep black |
| 5 | " | " | OH-phenyl-OH | " | " |
| 6 | " | OH, NH₂ naphthalene with SO₃Na, SO₃Na | " | " | " |
| 7 | —SO₃Na | " | " | greenish black | |
| 8 | " | " | NH₂-phenyl-NH₂ with CH₃ | grey to deep black | — |
| 9 | H | " | " | " | grey to deep black |
| 10 | " | " | { OH-phenyl-NH₂ (70-80%); OH-phenyl-NH₂ with CH₃ (20-30%) } | " | " |
| 11 | —SO₃Na | " | " | " | — |
| 12 | H | " | NH₂-phenyl-NH₂ with SO₃Na | " | — |

EXAMPLE 13

180 Parts of the compound of Example 1 or 165 parts of the compound of Example 2, in moist press-cake form, are dissolved in water at 80°. The solution is acidified to pH 1.4 employing hydrochloric acid and the precipitated dyestuff isolated. The isolated dyestuff is dissolved in 1000 parts of water with addition of 60 parts triethanolamine, and the solution is filtered. A dye solution is obtained which is storable for several months at room temperature and which can be used directly or after dilution for dyeing. Paper is dyed therewith in even grey to deep black shades, the dyeings showing notable wet and light-fastness properties and fastness to aqueous alcoholic beverages.

EXAMPLE 14

In analogous manner to Example 13 and employing the same amounts of dyestuff, the acidified dye was isolated. The dye was dissolved in 800 parts of water with addition of 200 parts urea and 9.6 parts lithium hydroxide and finally filtered cold. A solution of the dyestuff, in mixed lithium/sodium salt form, is obtained which is stable for several months and which dyes paper as described in Example 13.

In analogous manner to Examples 13 and 14, the compounds of the foregoing Examples 3 to 12 can also be formed into stable aqueous dye preparations.

EXAMPLE 15

180 Parts of the compound of Example 1 or 165 parts of the compound of Example 2, in moist press-cake form, are added to a solution of 30 parts sodium sulphate in 700 parts water and stirred to a homogeneous suspension. The suspension is then spray dried to obtain a black granulate which is well soluble in water and which dyes paper in grey to deep black shades.

Following the procedure of Example 15, granulate preparations of the dyes of Examples 3 to 12 can be obtained.

Dyeing Example A (a) 70 Parts of chemically bleached sulphite cellulose of conifer wood and 30 parts of chemically bleached sulphite cellulose of birchwood in 2000 parts of water are ground in a hollander. 1 Part of the dye of Example 1 or 2 in powder form or 5 parts of the dyestuff solution described in Example 13 or 14 are entered into this pulp. After mixing for 20 minutes, paper is produced from this pulp. The absorbent paper thus obtained is dyed in an even black shade.

(b) 1 Part of the dye of Example 1 or 2, in powder form, or 5 parts of the dyestuff solution described in Example 13 or 14 are added to 100 parts of chemically bleached sulphite cellulose which had been ground in 2,000 parts of water in a Hollander. After mixing for 15 minutes, sizing takes place. Paper produced therefrom is evenly dyed black.

The compounds of the foregoing Examples 3 to 12 or stable solutions thereof may likewise be employed.

Dyeing Example B

260 Parts of water at 50°–60° together with 10 parts of a 10% aqueous sodium sulphate solution and 1 part of a 10% aqueous sodium carbonate solution are entered into a dyeing vessel mounted in a heatable water bath. A paste is formed of 0.1 parts dyestuff of Example 2 with 2 parts of cold water and then 30 parts of warm water (50°–60°) are added thereto, whereupon the dyestuff dissolves. This dyestuff solution is then added to the dyeing vessel, whereafter 10 parts of a cotton fabric are entered and kept in motion in the dye liquor. Over 30 minutes the temperature of the dye liquor is raised to 85°–90° and dyeing continued at this temperature for a further 60 minutes. The fabric is then removed, wrung out, rinsed in cold water for 5–10 minutes and dried at 60°–70°. The fabric is dyed grey.

Similar results are obtained when the above is carried out using the compounds of foregoing Examples 4, 5, 6, 9 and 10.

What is claimed is:

1. A symmetrical compound of the formula

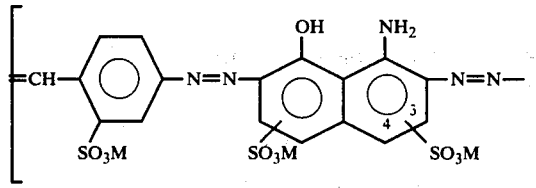

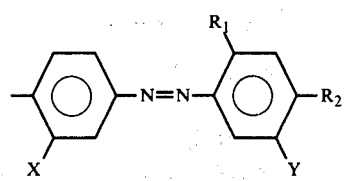

or a mixture of at least two such compounds, wherein
each $R_1$ is —OH or —$NH_2$,
each $R_2$ is —OH or —$NH_2$,
each X is hydrogen or —$SO_3M$,
each Y is hydrogen, methyl or —$SO_3M$, and
each M is independently hydrogen or a non-chromophoric cation.

2. A compound according to claim 1.

3. A compound according to claim 2 wherein each M is independently hydrogen, lithium, sodium, potassium or $N^{\oplus}(R_3)_4$,
wherein each $R_3$ is independently hydrogen, $C_{1-4}$alkyl or $C_{2-4}$hydroxyalkyl, with the proviso that at least one $R_3$ must be hydrogen or $C_{1-4}$alkyl.

4. A compound according to claim 2 wherein each M is an alkali metal cation.

5. A compound according to claim 4 wherein each M is sodium.

6. A compound according to claim 2 wherein
(a) each $R_1$ is —OH, and
each $R_2$ is —$NH_2$,
(b) each $R_1$ and $R_2$ is —$NH_2$ or
(c) each $R_1$ and $R_2$ is —OH.

7. A compound according to claim 6 wherein
each $R_1$ and $R_2$ is —$NH_2$ or
each $R_1$ and $R_2$ is —OH.

8. A compound according to claim 7 wherein each $R_1$ and $R_2$ is —$NH_2$.

9. A compound according to claim 6 wherein each Y is hydrogen, and
one —$SO_3M$ group on each naphthalene ring is in the 3- or 4-position and the other is in the 6-position.

10. A compound according to claim 9 wherein
each $R_1$ and $R_2$ is —$NH_2$ or
each $R_1$ and $R_2$ is —OH.

11. A compound according to claim 2 wherein each Y is hydrogen.

12. A compound according to claim 2 wherein the total number of —$SO_3M$ groups is six or eight.

13. A compound according to claim 12 wherein
each X is hydrogen, and
each Y is hydrogen or methyl.

14. A compound according to claim 2 wherein
one —$SO_3M$ group on each naphthalene ring is in the 3- or 4-position and the other is in the 6-position.

15. A compound according to claim 14 wherein
the —$SO_3M$ groups on each naphthalene ring are in the 3- and 6-positions.

16. A compound according to claim 1 having the formula

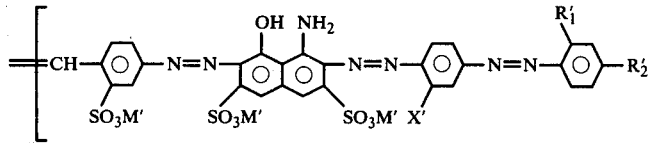

wherein
each $R_1'$ and $R_2'$ is —OH or each $R_1'$ and $R_2'$ is —$NH_2$,
each X' is hydrogen or —$SO_3M'$, and
each M' is sodium,
or a mixture of such compounds wherein
each M' is sodium or lithium, with the proviso that at least one M' per molecule is sodium and at least one M' per molecule is lithium.

17. A compound or mixture of compounds according to claim 16 wherein
each X' is hydrogen.

18. A compound or mixture of compounds according to claim 17 wherein each $R_1$ and $R_2$ is —$NH_2$.

19. A compound or mixture of compounds according to claim 16 wherein
each X' is —$SO_3M'$.

20. A compound or mixture of compounds according to claim 19 wherein
each $R_1$ and $R_2$ is —$NH_2$.

21. A mixture of compounds according to claim 1.

22. A mixture of compounds according to claim 21 wherein
each M is sodium or lithium, with the proviso that at least one M per molecule is sodium and at least one M per molecule is lithium.

23. A mixture of compounds according to claim 21, said mixture comprising at least two compounds of the formula

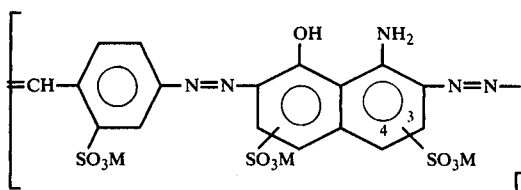

-continued

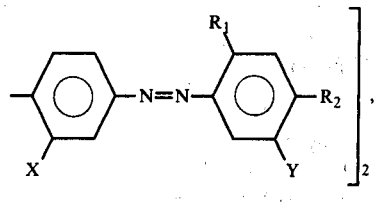

wherein
each $R_1$ is —OH or —$NH_2$,
each $R_2$ is —OH or —$NH_2$,
each X is hydrogen or —$SO_3M$,
each Y is hydrogen, methyl or —$SO_3M$, and
each M is independently hydrogen or a non-chromophoric cation,
said compounds differing with respect to (a) at least one member of the group consisting of $R_1$, $R_2$, X and Y, (b) the position of at least one —$SO_3M$ group on each naphthalene ring or (c) both (a) and (b).

24. The compound according to claim 18 having the formula

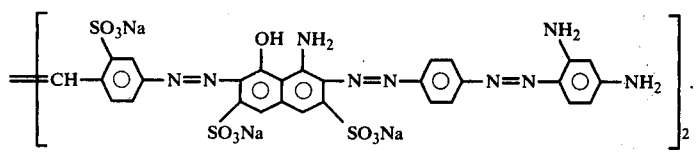

25. The compound according to claim 17 having the formula

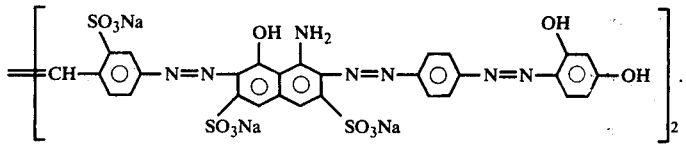

26. The compound according to claim 20 having the formula

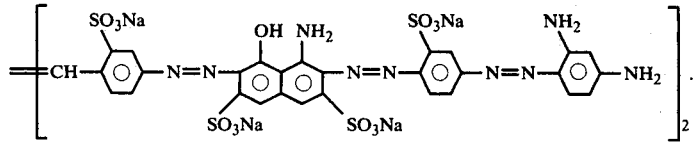

27. A mixture according to claim 23 of a compound of the formula

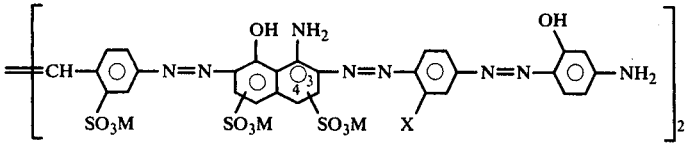

and a compound of the formula

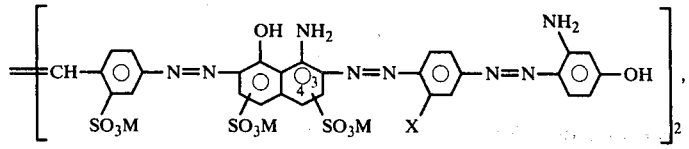

wherein
each X is hydrogen or —$SO_3M$, and
each M is independently hydrogen or a non-chromophoric cation.

* * * * *

UNITED STATES PATENT AND TRADEMARK OFFICE
CERTIFICATE OF CORRECTION

PATENT NO. : 4,141,889
DATED : February 27, 1979
INVENTOR(S) : Zdenek Allan

It is certified that error appears in the above—identified patent and that said Letters Patent are hereby corrected as shown below:

Column 10, line 50, that part of the structural formula reading "$-R_2^1\Big]$" should read -- $-R_2'\Big]_2$ --

Signed and Sealed this

Nineteenth Day of February 1980

[SEAL]

Attest:

SIDNEY A. DIAMOND

Attesting Officer

Commissioner of Patents and Trademarks